Patented Feb. 27, 1945

2,370,558

UNITED STATES PATENT OFFICE 2,370,558

NITRATION OF AROMATIC COMPOUNDS

Joseph R. Mares, Webster Groves, Mo., assignor to Monsanto Chemical Company, St. Louis, Mo., a corporation of Delaware No Drawing. Application November 22, 1940, Serial No. 366,703

9 Claims. (Cl. 260—645)

This invention relates to the mono-nitration of aromatic hydrocarbons such as benzene and substituted derivatives thereof, such as chlorobenzene. More particularly, this invention relates to a method of nitration wherein nitric acid is used in the nitration in lieu of "mixed acids," and water is removed from the reaction zone during the nitration.

Heretofore, numerous methods have been proposed for the preparation of the nitration products of aromatic hydrocarbons and their derivatives. Among these methods are those in which the nitration agents are concentrated nitric acid; "mixed acids," e. g., nitric acid admixed with a dehydrating acid such as oleum, sulfuric acid, benzene sulfonic acid, acetic anhydride and phosphorus pentoxide; alkali metal nitrates in the presence of sulfuric acid; organic nitrates, such as acetyl and benzoyl nitrates; metal nitrates in the presence of acetic acid; nitrosulfonic acid and nitrogen tetroxide. Of these methods, only that process utilizing a mixed acid has been widely used. The mixed acid commercially used is that consisting of sulfuric acid, nitric acid and small amounts of water.

In the mixed acid process for nitrobenzene, the nitrating mixed acid is gradually added with good agitation to benzene at temperatures within the range of about 40° C. to 90° C. Since the reaction is markedly exothermic, the reactor is equipped with a suitable cooling jacket or with cooling coils.

A composition of the mixed acid is chosen which will allow all or practically all of the nitric acid contained in the mixed acid to be consumed, and in order to make all of the nitric acid available for the nitration, sufficient sulfuric acid must be present in the original mixed acid. When less than this amount of sulfuric acid is present in the original mixed acid, not all of the nitric acid originally present is consumed. The diluted sulfuric acid containing small amounts of nitric acid and oxides of nitrogen which is separated and recovered from the nitration reaction is called "spent acid." The approximate composition of a mixed acid used in, and the spent acid obtained as a by-product from the mono-nitration of benzene is as follows:

| Mixed acid | | Spent acid | |
|---|---|---|---|
| | Per cent | | Per cent |
| $H_2SO_4$ | 55 | $H_2SO_4$ | 67 |
| $HNO_3$ | 33 | $HNO_3$ | 0.2 to 0.4 |
| $H_2O$ | 12 | $H_2O$ | 33 |

Although various modifications of the mixed acid process for the mono-nitration of benzene have been employed commercially with success, nevertheless, these processes have serious disadvantages. In all the mixed acid processes heretofore proposed and used, the spent acid has either been discarded and wasted, or the recovered spent acid subjected to expensive separation, recovery and concentration steps, since little or no use may be found for the spent acid as recovered directly from the nitration process without purification. It is obvious that mixed acid nitration has always presented a serious spent acid disposal problem.

Furthermore, in these processes involving the use of mixed sulfuric and nitric acids, the control necessary for successful operation is very critical. During the first stages of the nitration, the acid concentration of the nitration mixture is very high and there is danger of local high concentrations of the nitrating acid, which has resulted, at times, in serious explosions. Moreover, the heat capacity of the reaction mixture in the initial stages is low and it is difficult to maintain the proper temperature control. During the latter stages, when the acid concentration is lower because of dilution with more spent acid, the control of the temperature is much easier, and the danger of high local concentrations and explosions is obviated. The use of mixed acids, therefore, necessitates the most vigilant control in the stage where the strong mixed acid is added to the benzene.

Likewise, when a mixed acid is used as the nitrating agent, the optimum conditions for nitration during the first and latter stages are vastly different. In the first stages the nitration takes place using very high nitric acid concentrations, e. g., 30 to 40% of nitric acid in the mixed acid, and in the latter stages, the nitrations take place with 3 to 2% or less nitric acid in the spent acid. In the nitration of benzene, therefore, a procedure sometimes followed involves the use of a heel of spent acid from the preceding nitration, carrying out the initial nitration at 50° C. or below, and gradually raising the temperature until the reaction is completed at or about 90° C. The use of this heel of spent acid only partially moderates the undesirable violent reaction in the most active nitration stage.

Although the above mentioned mixed acid nitration process has been widely used for the nitration of benzene, the disadvantages hereinbefore mentioned have been recognized and appreciated. Not the least of these disadvantages is the cost of the equipment and labor necessary to recover the spent acids in salable form.

An important object of my invention is a process for nitrating benzene wherein no by-product spent acids are formed. A further object of my invention is a process for nitrating benzene wherein dilute nitric acid may effectively be employed as the nitrating agent. A still further object of my invention is the development of a process wherein benzene may be nitrated by a continuous process in which aqueous nitric acid may be used as the nitrating agent, and in which no by-product spent acids are produced. A still further object of my invention is the development of a benzene nitration process wherein the nitrations may be carried out continuously or batchwise under optimum conditions of temperature and nitric acid concentrations. A still further object of my invention is the development of a process for the nitration of benzene which can be easily controlled. Other objects of this invention will become apparent as the description proceeds.

I have discovered that benzene may be nitrated readily and easily by a process wherein aqueous nitric acid is added to a mixture of benzene, sulfuric acid and water, and, under certain conditions of temperature and pressure, the water present in the nitric acid used and that chemically formed in the nitration is removed during the nitration reaction. According to my process, this removal of water is accomplished by the distillation of the azeotropic benzene-water mixture from the nitration reaction mixture. The benzene and water in the condensed benzene-water distillate are separated from each other, the proper amount of water discarded, and the remainder of the water and all of the benzene returned to the reactor. More specifically, the amount of water removed by this distillation is that amount which it is necessary to remove in order to maintain the acid concentration in the acid phase of the reaction mixture at a predetermined value.

I have further discovered that the process hereinbefore described may be made continuous; that benzene may be continuously nitrated using as the nitrating material aqueous nitric acid, and that this continuous process produces very little or no by-product spent acid.

In order to illustrate my invention in more detail, the following examples of actual embodiments thereof are presented. The parts given in these examples are parts by weight.

*Example I*

Benzene was nitrated in accordance with my process by the batch method. A nitration reactor was equipped with a suitable heating jacket, a short fractionating distillation column fitted with a condenser and separator, addition tube and distributor for nitric acid, and a suitable agitator. Into this reactor there was charged 1060 parts of benzene, crystallizing point 5.2° C., and 1060 parts of a 70% solution of sulfuric acid. This mixture was then stirred, and 1620 parts of nitric acid (36° Bé.) were added slowly during the course of approximately 8 hours. The nitration reaction was markedly exothermic, and when the temperature of the reaction mixture reached 45° C., vacuum and heat were applied to the system. The pressure in the system was adjusted so that the benzene-water azeotrope distilled. The distillate was condensed, the benzene and water separated from each other, the benzene returned to the reactor, and that amount of water discarded which corresponded to that present in the added aqueous nitric acid and that thus far formed chemically in the nitration. The remainder of the water was returned to the reactor. During the course of the reaction, and during the addition of the nitric acid and removal of the corresponding amount of water, the temperature of the reaction mixture was gradually allowed to rise to 55° C. The rate of heating was so regulated that the proper amount of the azeotrope distilled. After the addition of all the nitric acid, and the separation and removal of approximately 1000 parts of water, the distillation was stopped, the pressure increased to atmospheric pressure, and the nitration completed by maintaining the reaction mixture at 55° to 60° C. for one hour. A test sample indicated complete nitration. The reactor charge was then transferred to a separating tank, and the lower acid layer separated and returned to the reactor for a subsequent nitration. The upper nitrobenzene layer was washed twice with water and then with sufficient sodium carbonate to maintain the aqueous layer alkaline. The nitrobenzene was then washed once more with water.

*Example II*

Benzene was also nitrated by a continuous process. In this continuous process, substantially equivalent quantities of benzene and nitric acid (30° Bé.) were fed into a quantity of aqueous sulfuric acid contained in a suitable nitration reactor similar to that hereinabove described; however, with the addition of an automatic separator through which a portion of the reaction mixture was circulated. In this separator the reaction mixture was allowed to separate into two phases; the lower acid phase was returned directly to the reactor, and the upper benzene-nitrobenzene phase was removed, counter-currently washed with water, and the benzene stripped by distillation in a stripping still and column. The benzene vapor from this stripping column was either condensed and returned to the reactor, or fed directly without condensation to the reacting mixture. The concentration of the sulfuric acid in the reactor was maintained at approximately 67% to 72% by removing only that amount of water which corresponded to that added in the nitric acid and that formed chemically. The temperature of the reaction mixture was maintained between 50° and 55° C. The pressure in the entire system and the rate of heating were so adjusted that the distillation of the benzene-water azeotrope proceeded smoothly. The nitrobenzene recovered from the stripping still was obtained as a product having a crystallizing point of 5.3° to 5.5° C. Approximately 150 parts of nitrobenzene were obtained from each 100 parts of benzene and 162 parts of 36° Bé. nitric acid. Approximately 100 parts of water were also removed for each 100 parts of benzene.

In the above examples, sulfuric acid concentrations of approximately 70% were used. However, sulfuric acid concentrations both higher and lower than this may also be used. For example, I may use concentrations of 85% or lower, although I prefer to use sulfuric acid concentrations within the range of 57% to 75%. Acid concentrations as low as 50% or lower may be used successfully. However, with these lower concentrations of sulfuric acid, cast iron equipment can no longer be used because of corrosion. Therefore, at these lower concentrations, acid resisting alloys or glass lined equipment must be used. Also with higher concentrations of sulfuric acid slightly more dinitrobenzene is formed.

Although temperatures within the range of 45° to 55° C. were used in the examples set forth hereinabove, temperatures within the range of 40° to 90° C. may also be used. At the higher temperatures, the rate of reaction is very rapid and the process, therefore, requires more careful control. At these higher temperatures slightly more dinitration takes place. At temperatures below 40° C., the rate of nitration of benzene is very slow.

In the example describing a batch nitration by my process, the time required for the nitration was about 8 hours. The time required to add the nitric acid is determined very largely by both the degree of agitation and the rate at which the benzene-water azeotrope may be distilled and condensed, the latter factor being very significant. By increasing the capacity of the column and condenser, the addition of the nitric acid can be made in two to three hours.

Although I have used 36° Bé. nitric acid in the above mentioned examples, stronger and weaker acids may be employed successfully. The commercially available 36° to 42° Bé. nitric acids, or even fuming nitric acid, may be used. Acids weaker than these may also be used, since the water present in these acids is removed readily in my process.

The amount of sulfuric acid of the proper concentration used in the reaction is not critical. In the example set forth hereinabove, one part by weight of 70% sulfuric acid was employed for one part of benzene. The ratio of sulfuric acid to benzene can be increased two or threefold. However, increasing this ratio offers no advantage and offers the disadvantage that the maximum amount of nitrobenzene produced in a given unit is thereby decreased. The ratio of the sulfuric acid solution to benzene may also be decreased to one-fourth or even less than that amount used in the example. When the ratio is too small, it is difficult to obtain accurate control of the dilution of the sulfuric acid phase since variations in the rate of removal of water from the reaction mixture produce corresponding wide variations in the water content of the acid phase under these conditions. When approximately that ratio set forth in the example is used, temporary and minor deviations in the amount of water removed by the benzene-water distillation do not appreciably affect the dilution of the sulfuric acid phase.

The pressure in the system, that is, the amount of vacuum necessarily applied to the system in order to distill the azeotropic benzene-water mixture, will be dependent upon the temperature of the reaction mixture and its composition.

The benzene separated from the condensed benzene-water azeotrope, which is returned to the system, either in the batch or continuous process, may be returned either as a vapor or as a liquid.

As has been previously set forth hereinabove, in the mono-nitration of benzene by my process, the concentrations of nitric and sulfuric acids and the temperatures at which the nitration can be effected may be widely varied. However, in order to completely nitrate all the benzene, a quantity of nitric acid equivalent to or slightly in excess of the theoretical amount must be used. The amount of water to be removed is necessarily that amount which is added in the nitric acid and that formed chemically.

In the examples set forth hereinabove, my process was described as applied to the mono-nitration of benzene. This process may, however, also be applied to the nitration of other aromatic compounds, such as toluene, chlorobenzene, etc. In the case of the mono-nitration of toluene, the nitration is preferably carried out at temperatures within the range of about 30° C. to 60° C., while, in the case of chlorobenzene, the nitration is preferably carried out at temperatures within the range of about 90° C. to 130° C. The pressure on the system in all cases is obviously that required to maintain the proper reaction temperature while removing water in vapor form during the course of the nitration. The amounts and concentration of sulfuric acid to be used in the above and other cases are similar to those found preferable in the nitration of benzene.

Inasmuch as the foregoing description comprises preferred embodiments of my invention, it is to be understood that my invention is not to be limited thereto and that modifications and variations may be used without departing substantially from the spirit or scope as defined in the appended claims.

What I claim is:

1. In the mono-nitration of benzene, the steps which comprise the addition of aqueous nitric acid to a mixture comprising benzene, water, and sulfuric acid, removing the water which was present in the added aqueous nitric acid and also that formed chemically in the nitration by distillation of a benzene-water azeotrope, separating the benzene from the water in said azeotrope, returning the separated benzene to the reactor and subsequently separating the nitrobenzene from the reaction mixture.

2. In the mono-nitration of benzene, the steps which comprise the addition of aqueous nitric acid to a mixture comprising benzene, water, and sulfuric acid at temperatures within the range of 45° C. to 90° C., simultaneously removing the water which was present in the added aqueous nitric acid and also that formed chemically in the nitration by distillation of a benzene-water azeotrope separating the benzene from the water in said azeotrope, returning the separated benzene to the reactor and subsequently separating the nitrobenzene from the reaction mixture.

3. In the mono-nitration of benzene, the steps which comprise the addition of aqueous nitric acid to a mixture comprising benzene and aqueous sulfuric acid, the molar ratio of sulfuric acid to water in said aqueous sulfuric acid being within the range of 1:4 to 1:1, at temperatures within the range of 45° to 90° C., simultaneously removing water from the reaction mixture by the distillation of a benzene-water azeotrope to maintain the molar ratio of sulfuric acid to water remaining in the reaction mixture within the range of 1:4 to 1:1, separating the benzene from the water in said azeotrope, returning the separated benzene to the reactor and subsequently separating the nitrobenzene from the reaction mixture.

4. In the mono-nitration of benzene, the steps which comprise the addition of aqueous nitric acid to a mixture comprising benzene and aqueous sulfuric acid, the molar ratio of sulfuric acid to water in said aqueous sulfuric acid being within the range of 1:3 to 1:2, at temperatures within the range of 45° to 65° C., simultaneously removing the water from the reaction mixture which was present in the added aqueous nitric acid and also that formed chemically in the nitration by distillation of a benzene-water azeotrope, separating the benzene from the water in said azeotrope, returning the separated benzene to the reactor and subsequently separating the nitrobenzene from the reaction mixture.

5. In a continuous process for the mono-nitration of benzene, the steps which comprise adding substantially equivalent quantities of benzene and aqueous nitric acid to a quantity of aqueous sulfuric acid, in which the molar ratio of sulfuric acid to water is within the range of 1:4 to 1:1, at temperatures within the range of 45° to 90° C., removing water from the resulting reaction mixture by distillation of a benzene-water azeotrope to maintain the molar ratio of sulfuric acid to water remaining in the reaction mixture within the range of 1:4 to 1:1, separating the benzene from the water in said azeotrope and returning the separated benzene to the reactor, removing a portion of the reaction mixture, separating said removed portion into an acid phase and a benzene-nitrobenzene phase, returning the acid phase to said reactor, separating the nitrobenzene from the benzene-nitrobenzene phase and returning the benzene to the reactor.

6. In a continuous process for the mono-nitration of benzene, the steps which comprise the addition of substantially equivalent quantities of benzene and aqueous nitric acid to a quantity of aqueous sulfuric acid, in which the molar ratio of sulfuric acid to water is within the range of 1:3 to 1:2, at temperatures within the range of 45° to 65° C., removing water from the resulting reaction mixture by distillation of a benzene-water azeotrope to maintain the molar ratio of sulfuric acid to water remaining in the reaction mixture within the range of 1:3 to 1:2, separating the benzene from the water in said azeotrope, returning the separated benzene to the reactor, removing a portion of the reaction mixture, separating said removed portion into an acid phase and a benzene-nitrobenzene phase, returning the acid phase to the reactor, separating the nitrobenzene from the benzene-nitrobenzene phase and returning the benzene to the reactor.

7. In the mono-nitration of benzene, the steps which comprise the addition of aqueous nitric acid to a mixture comprising benzene and aqueous sulfuric acid, the molar ratio of sulfuric acid to water in said aqueous sulfuric acid being within the range of 1:4 to 1:1, at temperatures within the range of 45° to 90° C., simultaneously removing water from the reaction mixture in an amount in excess of that which was present in the added aqueous nitric acid and also that formed chemically in the nitration by distillation of a benzene-water azeotrope, separating the benzene from the water in said azeotrope, discarding an amount of water equal to that which was present in the added aqueous nitric acid and also that formed chemically in the nitration, returning the separated benzene and the excess of water to the reactor and subsequently separating the nitrobenzene from the reaction mixture.

8. In the mono-nitration of benzene, the steps which comprise the addition of aqueous nitric acid to a mixture comprising benzene and aqueous sulfuric acid, the molar ratio of sulfuric acid to water in said aqueous sulfuric acid being within the range of 1:4 to 1:1, at temperatures within the range of 45° to 90° C., simultaneously removing water from the reaction mixture by the distillation of a benzene-water azeotrope, to maintain the molar ratio of sulfuric acid to water remaining in the reaction mixture within the range of 1:4 to 1:1, separating the benzene from the water in said azeotrope, returning the separated benzene to the reactor and subsequently separating the nitrobenzene from the reaction mixture and using the aqueous sulfuric acid remaining in the reactor in the nitration of additional benzene.

9. In the mono-nitration of an aromatic compound selected from the group consisting of benzene, toluene and chlorobenzene, the steps which comprise adding aqueous nitric acid to a mixture comprising said aromatic compound, water, and sulfuric acid, removing the water which was present in the added aqueous nitric acid and also that formed chemically in the nitration by distillation of a mixture of said aromatic compound and water, separating the aromatic compound from the water in said mixture, returning the separated aromatic compound to the reactor and separating the nitrated aromatic compound from the reaction mixture.

JOSEPH R. MARES.